United States Patent
Takizawa et al.

(10) Patent No.: US 10,983,371 B2
(45) Date of Patent: Apr. 20, 2021

(54) REFLECTIVE SPATIAL LIGHT MODULATOR, OPTICAL OBSERVATION DEVICE AND OPTICAL IRRADIATION DEVICE

(71) Applicant: HAMAMATSU PHOTONICS K.K., Hamamatsu (JP)

(72) Inventors: Kuniharu Takizawa, Hamamatsu (JP); Hiroshi Tanaka, Hamamatsu (JP); Haruyoshi Toyoda, Hamamatsu (JP); Yasushi Ohbayashi, Hamamatsu (JP); Hiroto Sakai, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 115 days.

(21) Appl. No.: 16/307,527

(22) PCT Filed: Jun. 5, 2017

(86) PCT No.: PCT/JP2017/020869
§ 371 (c)(1),
(2) Date: Dec. 6, 2018

(87) PCT Pub. No.: WO2017/213098
PCT Pub. Date: Dec. 14, 2017

(65) Prior Publication Data
US 2019/0302488 A1    Oct. 3, 2019

(30) Foreign Application Priority Data

Jun. 6, 2016   (JP) .............................. JP2016-112850

(51) Int. Cl.
*G02F 1/03*    (2006.01)
*G02B 26/08*   (2006.01)
(Continued)

(52) U.S. Cl.
CPC ............... *G02F 1/03* (2013.01); *G01N 21/17* (2013.01); *G02B 26/0816* (2013.01);
(Continued)

(58) Field of Classification Search
CPC ........................................... G02F 1/03–1/0558
(Continued)

(56) References Cited

U.S. PATENT DOCUMENTS 3,938,878 A    2/1976  Fox
5,221,989 A *  6/1993  Stappaerts ............ G02F 1/0551
                                                         359/258
(Continued)

FOREIGN PATENT DOCUMENTS

CN    102096206 A    6/2011
CN    103605217 A    2/2014
(Continued)

OTHER PUBLICATIONS

International Preliminary Report on Patentability dated Dec. 20, 2018 for PCT/JP2017/020869.
(Continued)

*Primary Examiner* — Zachary W Wilkes
(74) *Attorney, Agent, or Firm* — Faegre Drinker Biddle & Reath LLP (57) ABSTRACT

A reflective spatial light modulator includes a perovskite-type electro-optic crystal having a relative permittivity of 1,000 or higher, a light input and output unit disposed on an input surface of the electro-optic crystal and including a first electrode through which input light is transmitted, a light reflecting unit including a plurality of second electrodes disposed on a rear surface of the electro-optic crystal and reflects the input light toward the light input and output unit, a drive circuit including a plurality of drive electrodes respectively corresponding to the plurality of second elec-
(Continued)

trodes and for applying an electric field to a part between the first electrode and the second electrode by inputting an electrical signal to each of the plurality of drive electrodes, and a plurality of bumps which are disposed such that the plurality of second electrodes and the plurality of drive electrodes are electrically connected to each other.

8 Claims, 6 Drawing Sheets

(51) Int. Cl.
  *G09G 3/36* (2006.01)
  *G01N 21/17* (2006.01)
(52) U.S. Cl.
  CPC .......... *G02F 1/0316* (2013.01); *G02F 1/0327* (2013.01); *G09G 3/3648* (2013.01)
(58) Field of Classification Search
  USPC .................................................. 359/323, 258
  See application file for complete search history.

(56) References Cited

U.S. PATENT DOCUMENTS

| | | | |
|---|---|---|---|
| 5,291,314 | A | 3/1994 | Argranat et al. |
| 5,497,258 | A * | 3/1996 | Ju .................... G02F 1/13452 349/149 |
| 6,211,991 | B1 | 4/2001 | Bryan |
| 6,525,867 | B1 * | 2/2003 | Oakley ................ G02F 1/0551 250/214.1 |
| 6,950,584 | B1 | 9/2005 | Suzuki |
| 2005/0152024 | A1 | 7/2005 | Awaya et al. |
| 2006/0070715 | A1 | 4/2006 | Connors, Jr. et al. |
| 2010/0166464 | A1 | 7/2010 | Cho |
| 2010/0244632 | A1 | 9/2010 | Maekawa et al. |
| 2011/0170160 | A1 | 7/2011 | Park et al. |
| 2011/0255148 | A1 | 10/2011 | Ohta et al. |
| 2013/0057953 | A1 * | 3/2013 | Yokoi .................... G02B 21/16 359/388 |
| 2018/0276843 | A1 | 9/2018 | Send et al. |

FOREIGN PATENT DOCUMENTS

| | | |
|---|---|---|
| JP | S53-3841 A | 1/1978 |
| JP | H5-224165 A | 9/1993 |
| JP | H09-502813 A | 3/1997 |
| JP | 2005-234541 A | 9/2005 |
| JP | 2006-65037 A | 3/2006 |
| JP | 2010-19630 A | 1/2010 |
| JP | 2010-224003 A | 10/2010 |
| JP | 2014-89340 A | 5/2014 |
| JP | 2014-89341 A | 5/2014 |
| JP | 2014-202786 A | 10/2014 |
| JP | 2014-219495 A | 11/2014 |
| JP | 2015-158531 A | 9/2015 |
| WO | WO-95/06272 A1 | 3/1995 |

OTHER PUBLICATIONS

International Preliminary Report on Patentability dated Dec. 20, 2018 for PCT/JP2017/020871.
International Preliminary Report on Patentability dated Dec. 20, 2018 for PCT/JP2017/020873.
International Preliminary Report on Patentability dated Dec. 20, 2018 for PCT/JP2017/020870.
U.S. Office Action dated Dec. 21, 2020 issued in U.S. Appl. No. 16/307,511, including double-patenting rejection based on U.S. Appl. No. 16/769,321 and U.S. Appl. No. 16/769,327.
Notification of First Office Action dated Dec. 23, 2020 in Chinese Patent Application No. 201780029529.8 (7 pages) with an English translation (3 pages).

* cited by examiner

REFLECTIVE SPATIAL LIGHT MODULATOR, OPTICAL OBSERVATION DEVICE AND OPTICAL IRRADIATION DEVICE

TECHNICAL FIELD

The present disclosure relates to a reflective spatial light modulator, an optical observation device, and an optical irradiation device.

BACKGROUND ART

For example, Patent Literature 1 and Patent Literature 2 disclose electro-optical elements. These electro-optical elements include a substrate, a KTN ($KTa_{1-x}Nb_xO_3$) layer that is constituted of a ferroelectric substance laminated on the substrate, a transparent electrode that is disposed on a front surface of the KTN layer, and a metal electrode that is disposed on a rear surface of the KTN layer. KTN adopts four crystal structures depending on the temperature and is utilized as an electro-optical element when having a perovskite-type crystal structure. Such a KTN layer is formed on a seed layer which is formed on a metal electrode.

CITATION LIST

Patent Literature

[Patent Literature 1] Japanese Unexamined Patent Publication No. 2014-89340
[Patent Literature 2] Japanese Unexamined Patent Publication No. 2014-89341

SUMMARY OF INVENTION

Technical Problem

In an electro-optical element as described above, when a KTN layer has a high relative permittivity and a seed layer has a low relative permittivity, even if an electric field is applied between electrodes, there is a possibility that an electric field may not be sufficiently applied to the KTN layer. Therefore, sometimes conductivity is applied to the seed layer and an electric field is applied to the KTN layer by adding a conductive substance to the seed layer. However, for example, when a plurality of metal electrodes of the electro-optical element is formed in an array shape, there is concern that if conductivity is applied to the seed layer, electrical signals input to the plurality of metal electrodes may be mixed together so that modulation accuracy becomes unstable.

An object of an embodiment is to provide a reflective spatial light modulator, an optical observation device, and an optical irradiation device, in which electrical signals input to a plurality of electrodes are prevented from being mixed together, and the modulation accuracy is stable.

Solution to Problem

According to an aspect, there is provided a reflective spatial light modulator for modulating input light and outputting modulated light that has been subjected to modulation. The reflective spatial light modulator includes a perovskite-type electro-optic crystal having a relative permittivity of 1,000 or higher and including an input surface to which the input light is input and a rear surface which is a surface on the opposite side of the input surface; a light input and output unit disposed on the input surface of the electro-optic crystal and including a first electrode through which the input light is transmitted; a light reflecting unit including a plurality of second electrodes disposed on the rear surface of the electro-optic crystal and reflects the input light toward the light input and output unit; a drive circuit including a plurality of drive electrodes respectively corresponding to the plurality of second electrodes in the light reflecting unit and for applying an electric field between the first electrode and the second electrode by inputting an electrical signal to each of the plurality of drive electrodes; and an electrode connection portion including a plurality of bumps which is disposed such that the plurality of second electrodes and the plurality of drive electrodes corresponding to the plurality of second electrodes are electrically connected to each other.

In addition, according to another aspect, there is provided an optical observation device including a light source for outputting input light, the reflective spatial light modulator described above, an optical system for irradiating a target with modulated light output from the reflective spatial light modulator, and a light detector for detecting light output from the target.

In addition, according to another aspect, there is provided an optical irradiation device including a light source for outputting input light, the reflective spatial light modulator described above, and an optical system for irradiating a target with modulated light output from the reflective spatial light modulator.

According to the reflective spatial light modulator, the optical observation device, and the optical irradiation device described above, input light is transmitted through the first electrode of the light input and output unit and is input to the input surface of the perovskite-type electro-optic crystal. This input light is reflected by the light reflecting unit disposed on the rear surface of the electro-optic crystal and can be output from the light input and output unit. In this case, an electrical signal is input to a part between the first electrode provided in the light input and output unit and the plurality of second electrodes provided in the light reflecting unit. Consequently, an electric field is applied to the electro-optic crystal having a high relative permittivity, and input light can be modulated. In this reflective spatial light modulator, the plurality of drive electrodes is electrically connected to the plurality of corresponding second electrodes by the plurality of bumps. Accordingly, when an electric field is applied to the electro-optic crystal, an electric field is individually applied to the plurality of second electrodes between the first electrode and the plurality of second electrodes. Therefore, electrical signals input to a plurality of electrodes are prevented from being mixed together, and the modulation accuracy is stable.

In addition, the aspect may further include a transparent substrate including a first surface to which the input light is input and a second surface which is a surface on the opposite side of the first surface. The second surface of the transparent substrate and the input surface of the light input and output unit may face each other. In such a spatial light modulator, even if an electro-optic crystal is formed to have a small thickness in an optical axis direction, the electro-optic crystal is protected from an external shock or the like by the transparent substrate.

In addition, according to the aspect, the first electrode may be formed over the entire input surface. For example, when a plurality of first electrodes is provided to respectively correspond to the plurality of second electrodes, it is difficult for the first electrodes and the second electrodes to be positionally aligned. In the above configuration, there is no need to perform positional alignment of first electrodes and second electrodes.

In addition, according to the aspect, in the light reflecting unit, the input light may be reflected by the plurality of second electrodes. According to this configuration, there is no need to separately provide a reflecting layer or the like on the second electrode side.

In addition, according to the aspect, the electro-optic crystal may be a crystal of $KTa_{1-x}Nb_xO_3$ ($0 \leq x \leq 1$), a crystal of $K_{1-y}Li_yTa_{1-x}Nb_xO_3$ ($0 \leq x \leq 1$ and $0 < y < 1$), or a PLZT crystal. According to this configuration, an electro-optic crystal having a high relative permittivity can be easily realized.

In addition, the aspect may further include a temperature control element for controlling the temperature of the electro-optic crystal. According to this configuration, the modulation accuracy is more stable due to a uniformly maintained temperature for the electro-optic crystal.

Effects of Invention

According to the reflective spatial light modulator, the optical observation device, and the optical irradiation device of the embodiments, electrical signals input to a plurality of electrodes are prevented from being mixed together, and the modulation accuracy is stable.

DESCRIPTION OF EMBODIMENTS

Hereinafter, embodiments will be described in detail with reference to the drawings. For convenience, there are cases in which the same reference signs are applied to substantially the same elements and description thereof is omitted.

First Embodiment

Figure 1:
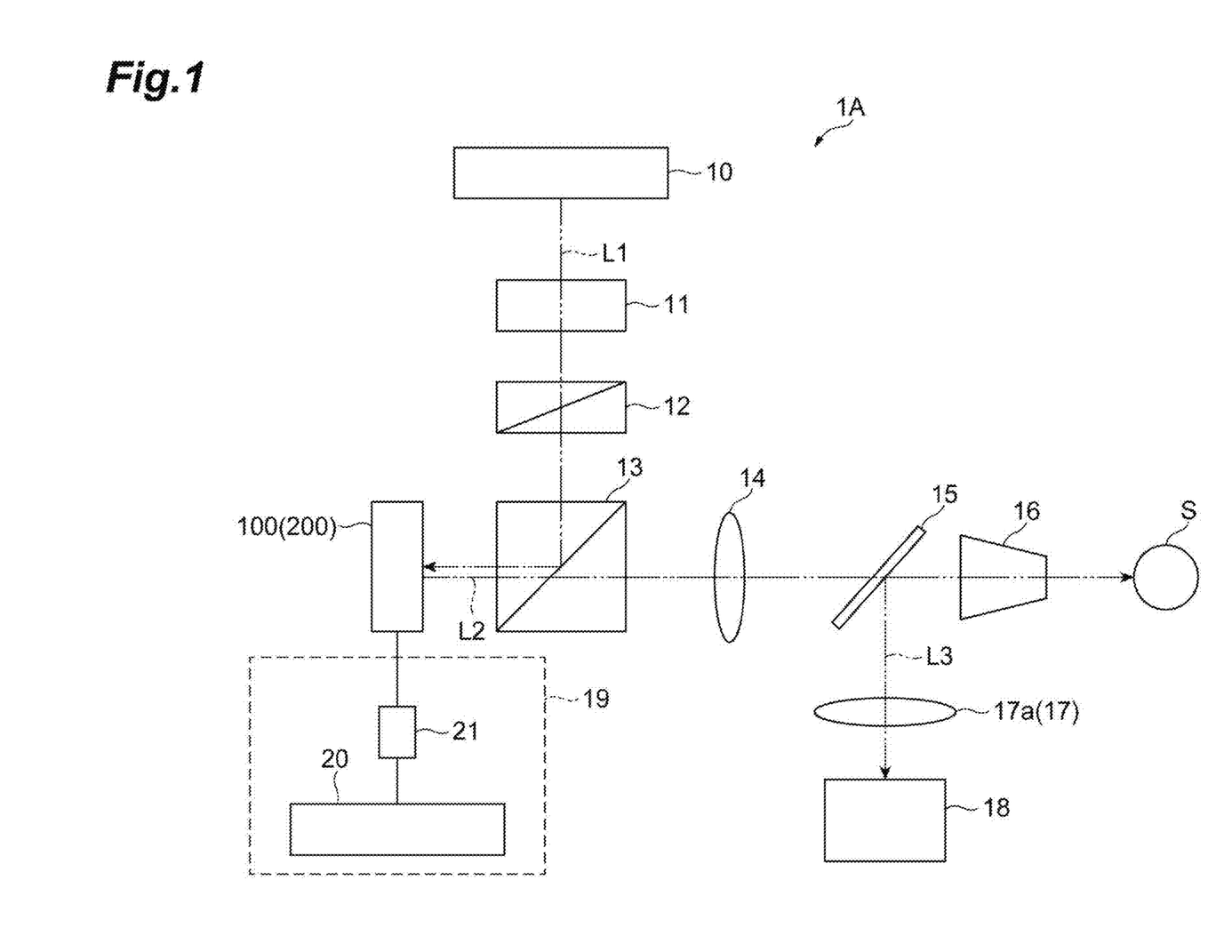
FIG. 1 is a block diagram illustrating a configuration of an optical observation device according to an embodiment.

FIG. 1 is a block diagram illustrating a configuration of an optical observation device according to an embodiment. For example, an optical observation device 1A is a fluorescence microscope for capturing an image of an observation target. The optical observation device 1A irradiates a surface of a specimen (target) S with input light L1 and captures an image of detection light L3 such as fluorescence or reflected light output from the specimen S in response to the irradiation, thereby acquiring an image of the specimen S.

For example, the specimen S, which becomes an observation target, is a sample such as a cell or an organism containing a fluorescent material such as a fluorescent pigment or fluorescent protein. In addition, the specimen S may be a sample such as a semiconductor device or a film. When the specimen S is irradiated with light having a predetermined wavelength region (excitation light or illumination light), the specimen S emits the detection light L3 such as fluorescence, for example. For example, the specimen S is accommodated inside a holder having transparency with respect to at least the input light L1 and the detection light L3. For example, this holder is held on a stage.

As illustrated in FIG. 1, the optical observation device 1A includes a light source 10, a collimator lens 11, a polarizer 12, a polarization beam splitter 13, a spatial light modulator 100, a first optical system 14, a beam splitter 15, an object lens 16, a second optical system 17, a light detector 18, and a control unit 19.

The light source 10 outputs the input light L1 having a wavelength at which the specimen S is excited. For example, the light source 10 emits coherent light or incoherent light. Examples of a coherent light source include a laser light source such as a laser diode (LD). Examples of an incoherent light source include a light emitting diode (LED), a super-luminescent diode, (SLD) and a lamp-based light source.

The collimator lens 11 collimates the input light L1 output from the light source 10 and outputs the collimated input light L1. The input light L1 is selectively transmitted through polarizer 12 in accordance with polarization components. For example, S-wave light of the input light L1 is transmitted through the polarizer 12. The polarization beam splitter 13 reflects the input light L1, which has been transmitted through the polarizer 12, toward the spatial light modulator 100. The spatial light modulator 100 is a spatial light modulator which modulates the phase or performs retardation (phase difference) of the input light L1 output from the light source 10. The spatial light modulator 100 modulates the input light L1 input from the collimator lens 11 and outputs modulated light L2 that has been subjected to modulation toward the polarization beam splitter 13. At this time, the spatial light modulator 100 rotates a polarization surface for the input light L1 90 degrees and outputs the modulated light L2. Therefore, the modulated light L2 output from the spatial light modulator 100 is transmitted through the polarization beam splitter 13 and is guided to the first optical system 14. The spatial light modulator 100 in the present embodiment is constituted as a reflective spatial light modulator. The spatial light modulator 100 is electrically connected to a controller 21 of the control unit 19 and constitutes a spatial light modulation unit. Driving of the spatial light modulator 100 is controlled by the controller 21 of control unit 19. The spatial light modulator 100 will be described below in detail. As functions of the spatial light modulator 100, (1) the position of an irradiation spot may be limited, (2) the position of the irradiation spot may be moved, (3) a plurality of irradiation spots may be formed at the same time, and (4) the phase of irradiation light may be controlled.

The first optical system 14 optically couples the spatial light modulator 100 and the object lens 16 to each other. Accordingly, the modulated light L2 output from the spatial light modulator 100 is guided to the object lens 16. For example, the first optical system 14 is a lens, which concentrates the modulated light L2 from the spatial light modulator 100 by a pupil of the object lens 16.

The beam splitter 15 is an optical element for separating the modulated light L2 and the detection light L3 from each other. For example, the beam splitter 15 is configured to allow the modulated light L2 having an excitation wavelength to be transmitted, and to reflect the detection light L3 having a fluorescence wavelength. In addition, the beam splitter 15 may be a polarization beam splitter or a dichroic mirror. Depending on the optical systems on the front and rear sides (for example, the first optical system 14 and the second optical system 17) of the beam splitter 15 or the type of the microscope to be applied, the beam splitter 15 may be configured to reflect the modulated light L2 and to allow the detection light L3 having a fluorescence wavelength to be transmitted.

The object lens 16 concentrates the modulated light L2 that has been subjected to modulation by the spatial light modulator 100, irradiates the specimen S with the concentrated light, and guides the detection light L3 emitted from the specimen S in response to the irradiation. For example, the object lens 16 is configured to be movable along an optical axis by a drive element such as a piezoelectric actuator or a stepping motor. Accordingly, a concentration position of the modulated light L2 and a focal position for detecting the detection light L3 can be adjusted.

The second optical system 17 optically couples the object lens 16 and the light detector 18 to each other. Accordingly, the light detector 18 forms an image of the detection light L3 guided from the object lens 16. The second optical system 17 has a lens 17a which forms an image of the detection light L3 from the object lens 16 on a light receiving surface of the light detector 18.

The light detector 18 captures an image of the detection light L3 which has been guided by the object lens 16 and formed on the light receiving surface as an image. For example, the light detector 18 is an area image sensor such as a CCD image sensor or a CMOS image sensor.

The control unit 19 includes a computer 20 having a control circuit (processor), an image processing circuit (processor), a memory, and the like; and the controller 21 having a control circuit (processor), a memory, and the like and being electrically connected to the spatial light modulator 100 and the computer 20. For example, the computer 20 is a personal computer, a smart device, a microcomputer, a cloud server, or the like. The computer 20 causes the processor to control operations of the object lens 16, the light detector 18, and the like and executes various types of control. In addition, the controller 21 controls the phase modulation amount or the retardation modulation amount in the spatial light modulator 100.

Figure 2:
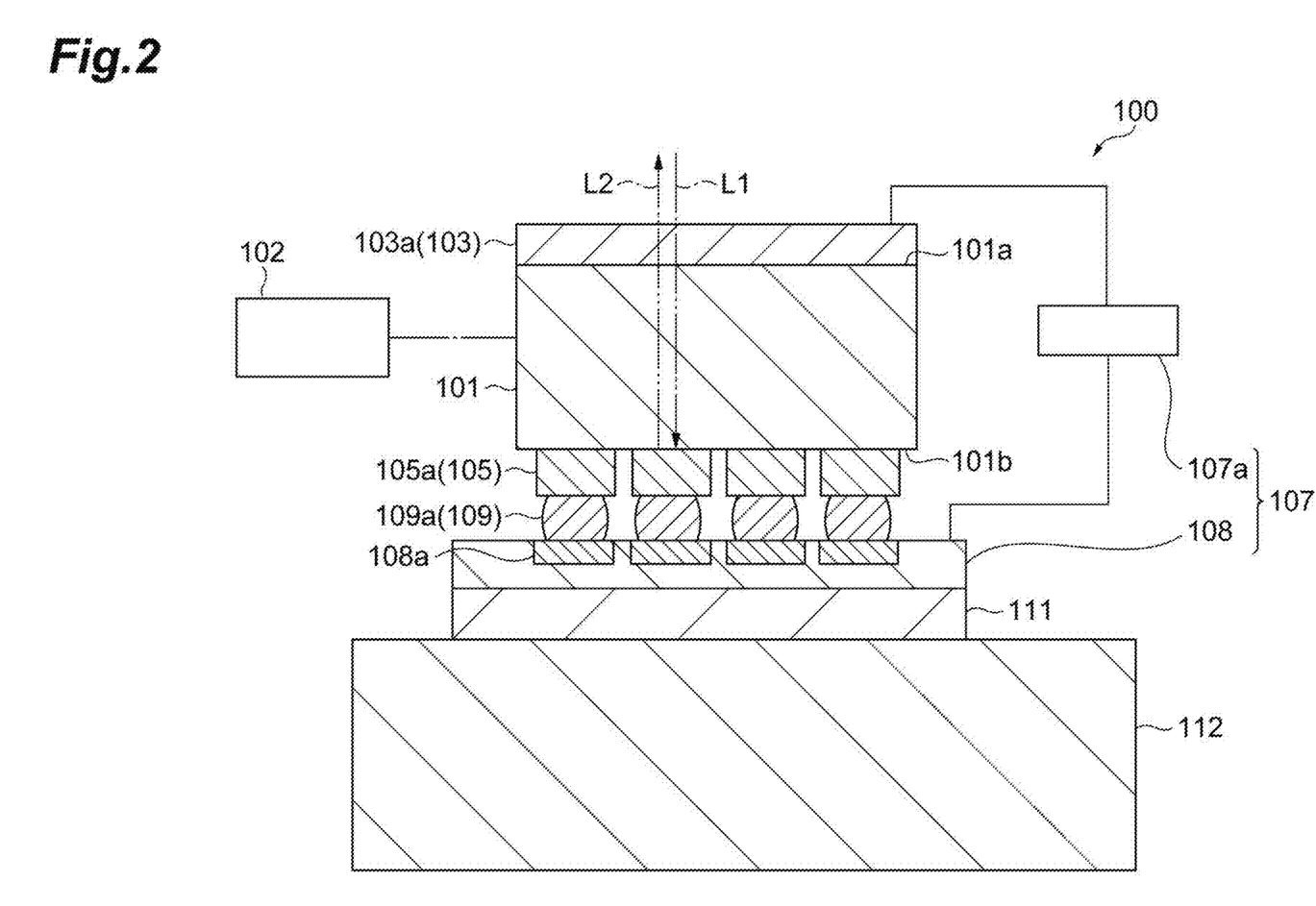
FIG. 2 is a cross-sectional view illustrating a spatial light modulator used in the optical observation device in FIG. 1.
Figure 3:
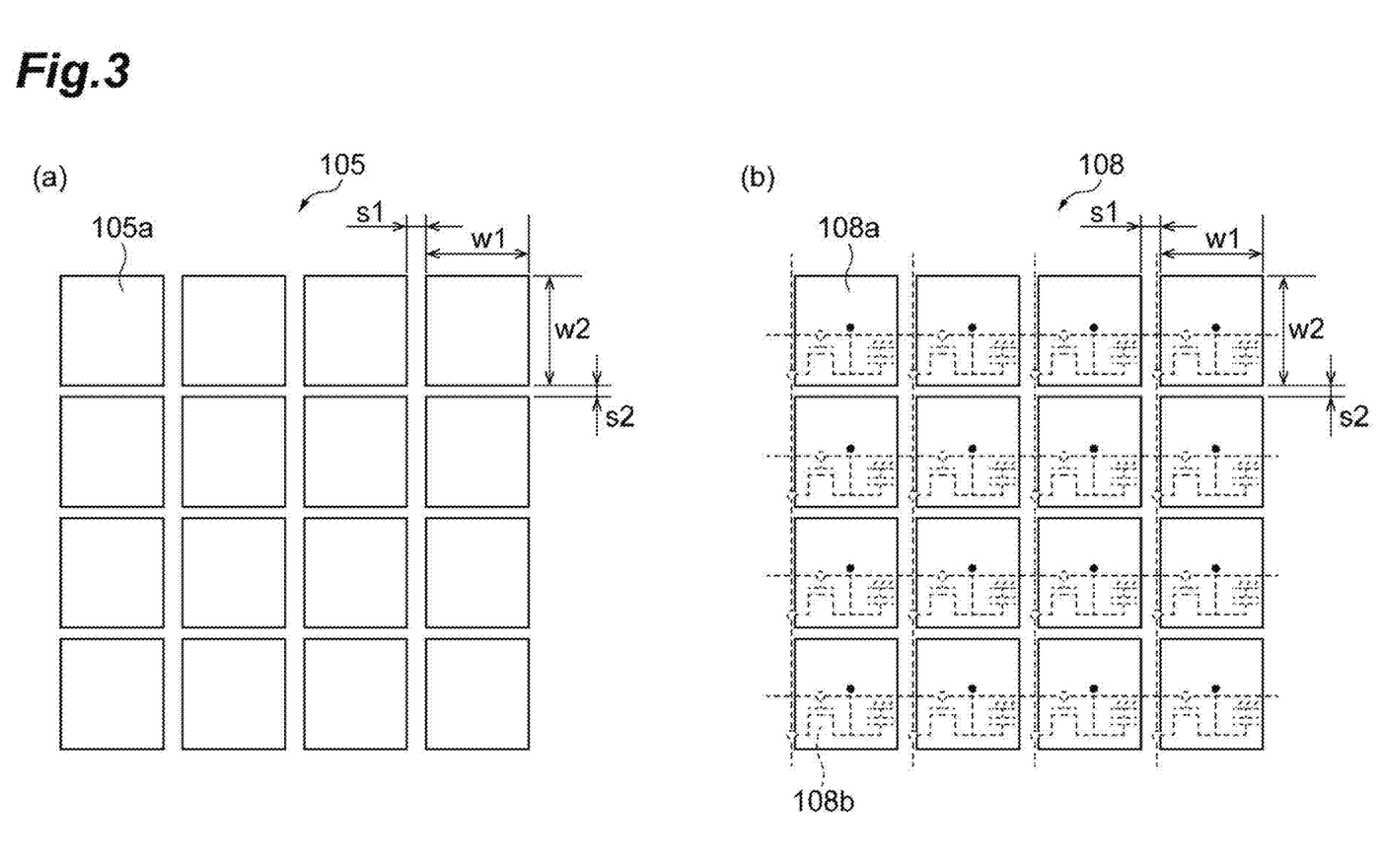
FIG. 3 is a view for describing electrodes of the spatial light modulator in FIG. 2.

Next, the spatial light modulator 100 will be described in detail. FIG. 2 is a cross-sectional view illustrating the spatial light modulator. In addition, FIG. 3 is a view for describing electrodes of the spatial light modulator. The spatial light modulator 100 is a reflective spatial light modulator which modulates the input light L1 and outputs the modulated light L2 that has been subjected to modulation. As illustrated in FIG. 2, the spatial light modulator 100, includes an electro-optic crystal 101, a light input and output unit 103, a light reflecting unit 105, a drive circuit 107, and an electrode connection portion 109.

Figure 4:
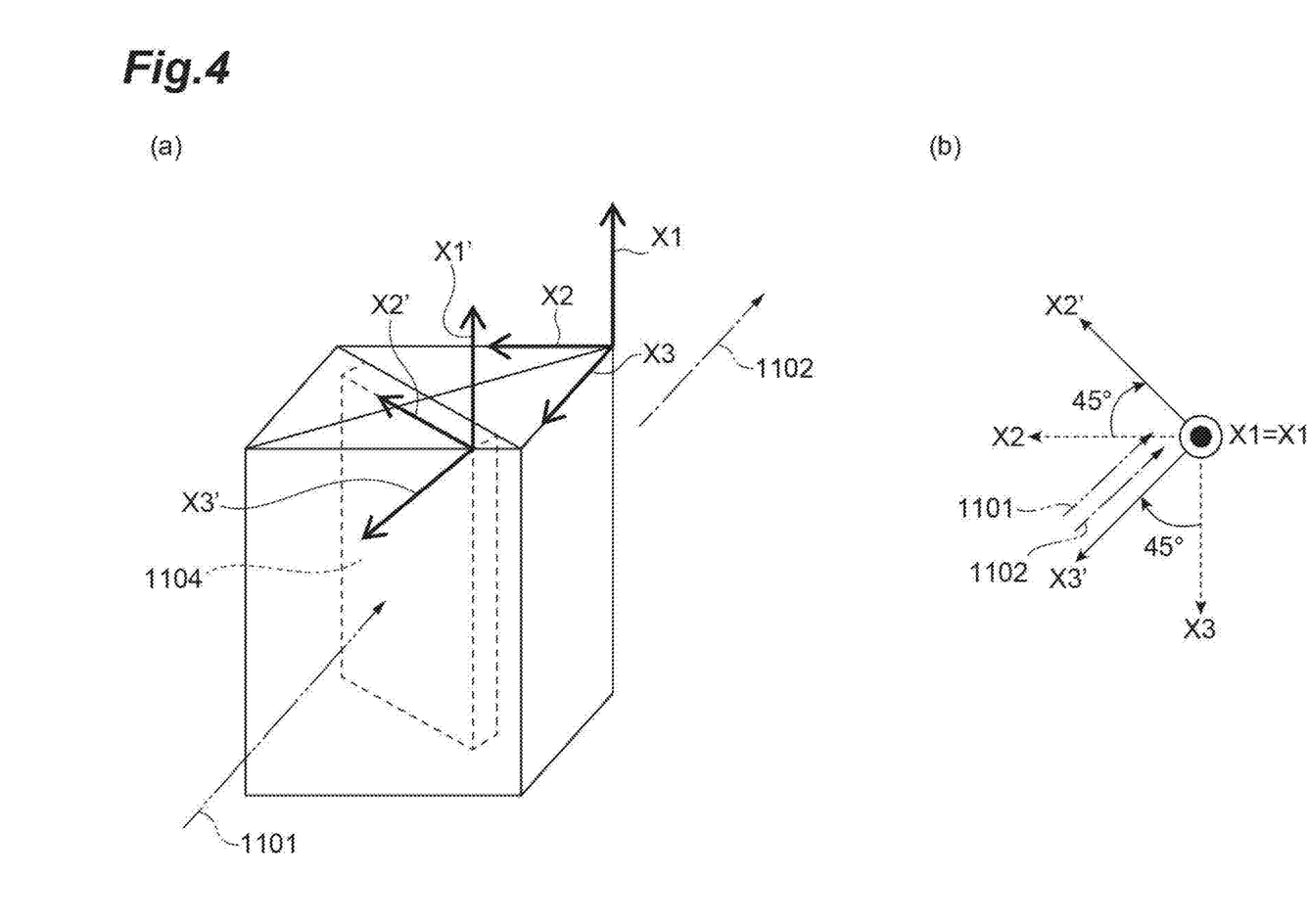
FIG. 4 is a view illustrating a relationship among crystal axes, a traveling direction of light, and an electric field in retardation modulation.

The electro-optic crystal 101 has a plate shape including an input surface 101a to which the input light L1 is input, and a rear surface 101b which faces the input surface 101a. The electro-optic crystal 101 has a perovskite-type crystal structure utilizing an electro-optical effect such as a Pockels effect and a Kerr effect for variation of the refractive index. The electro-optic crystal 101 having a perovskite-type crystal structure is an isotropic crystal which belongs to a point group m3m of a cubic system and has a relative permittivity of 1,000 or higher. For example, the relative permittivity of the electro-optic crystal 101 may have a value ranging from approximately 1,000 to 20,000. Examples of such an electro-optic crystal 101 include a crystal of $KTa_{1-x}Nb_xO_3$ ($0 \le x \le 1$) (will hereinafter be referred to as a "KTN crystal"), a crystal of $K_{1-y}Li_yTa_{1-x}Nb_xO_3$ ($0 \le x \le 1$ and $0 < y < 1$), and a PLZT crystal. Specifically, examples thereof include $BaTiO_3$, $K_3Pb_3(Zn_2Nb_7)O_{27}$, $K(Ta_{0.65}Nb_{0.35})P_3$, $Pb_3MgNb_2O_9$, and $Pb_3NiNb_2O_9$. In the spatial light modulator 100 of the present embodiment, a KTN crystal is used as the electro-optic crystal 101. Since a KTN crystal is in the point group m3m of the cubic system, the KTN crystal has no Pockels effect and performs modulation due to the Kerr effect. Therefore, since light is input in a manner of being parallel or perpendicular to a crystal axis of the electro-optic crystal 101, phase modulation can be performed by applying an electric field in the same direction. In addition, retardation modulation can be performed by rotating two arbitrary crystal axes about the remaining axis at an arbitrary angle other than 0° and 90°. FIG. 4(a) is a perspective view illustrating a relationship among the crystal axes, a traveling direction of light, and an electric field in retardation modulation. FIG. 4(b) is a plan view illustrating each of the axes. The example in FIG. 4 illustrates a case in which a crystal is rotated at an angle of 45°. When axes X2 and X3 are rotated 45° about an axis X1 and new axes X1, X2', and X3' are set, retardation modulation can be performed by inputting light in a manner of being parallel or perpendicular to these new axes. In FIG. 4, an electric field is applied in an applying direction 1102 of a crystal 1104. A propagation direction 1101 of the input light L1 becomes parallel to the applying direction 1102 of the electric field. In this case, Kerr coefficients used for modulating the input light L1 are g11, g12, and g44.

The relative permittivity of a KTN crystal is likely affected by the temperature. For example, the relative permittivity is a maximum at approximately 20,000 at a temperature near −5° C., and the relative permittivity decreases to approximately 5,000 at a normal temperature close to 20° C. Therefore, for example, the temperature of the electro-optic crystal 101 is controlled such that it is a temperature near −5° C. by a temperature control element 102 such as a Peltier element.

The light input and output unit 103 has a first electrode 103a disposed on the input surface 101a of the electro-optic crystal 101. For example, the first electrode 103a is a transparent electrode formed of ITO (indium tin oxide) and allows the input light L1 to be transmitted through. That is, the input light L1 is transmitted through the first electrode 103a and is input to the inside of the electro-optic crystal 101. In the present embodiment, the first electrode 103a is formed over the entire input surface 101a. For example, the first electrode 103a may be formed by depositing ITO on the input surface 101a of the electro-optic crystal 101.

The light reflecting unit 105 has a plurality of second electrodes 105a disposed on the rear surface 101b of the electro-optic crystal 101. The second electrodes 105a can reflect the input light L1, which is propagated inside the electro-optic crystal 101, toward the light input and output unit 103. For example, the second electrodes 105a are metal electrodes and may be formed of aluminum or the like. As illustrated in FIG. 3, in the light reflecting unit 105 according to the present embodiment, the plurality of second electrodes 105a is formed to have a rectangular shape in a plan view and are disposed in a two-dimensional manner. For example, a length W1 of the second electrode 105a in a lateral direction and a length W2 thereof in a vertical direction may be formed to be the same length. Second electrodes 105a adjacent to each other are disposed with a space S1 or S2 therebetween. Such second electrodes 105a may be formed by depositing aluminum or the like on the rear surface 101b of the electro-optic crystal 101 using a mask pattern. FIGS. 2 and 3 schematically illustrate the spatial light modulator 100. In order to simplify the description, the diagrams illustrate an example in which the second electrodes 105a are disposed in a 4×4 array.

The drive circuit 107 has a CMOS substrate 108 and a signal control circuit 107a. The CMOS substrate 108 is fixed to a substrate 112 such as an organic substrate, for example, a glass epoxy (epoxy resin having a glass fiber sheet as a core material) substrate, a ceramic substrate, and the like, with an adhesion layer 111 interposed therebetween. The CMOS substrate 108 has a plurality of pixel electrodes (drive electrodes) 108a respectively corresponding to the plurality of second electrodes 105a. That is, in the CMOS substrate 108, the plurality of pixel electrodes 108a formed to have a rectangular shape in a plan view are disposed in a two-dimensional manner at the same array pitch as that of the second electrodes 105a. The length W1 of the pixel electrode 108a in the lateral direction and the length W2 thereof in the vertical direction are similar to those of the second electrode 105a. In addition, pixel electrodes 108a adjacent to each other are disposed with the space S1 or S2 therebetween. The pixel electrode 108a of the CMOS substrate 108 and the second electrode 105a face each other.

Driving switches 108b are provided in the plurality of corresponding pixel electrodes 108a. Each of the pixel electrodes 108a can be controlled at an arbitrary voltage by these switches 108b. The signal control circuit 107a is electrically connected to the CMOS substrate 108 and the first electrode 103a. The signal control circuit 107a inputs an electrical signal to each of the plurality of pixel electrodes 108a and applies an electric field between the first electrode 103a and the second electrodes 105a. Such a signal control circuit 107a is controlled by the control unit 19.

The electrode connection portion 109 has a plurality of bumps 109a. The same number of bumps 109a are formed as that of the second electrodes 105a and the pixel electrodes 108a. The plurality of bumps 109a electrically connect the plurality of second electrodes 105a and the plurality of pixel electrodes 108a respectively corresponding to these second electrodes 105a to each other on a one-to-one basis. For example, the bumps 109a may be formed of gold (Au), a solder material, or the like. Between the electro-optic crystal 101 and the CMOS substrate 108, a part between bumps 109a adjacent to each other and a part between second electrodes 105a adjacent to each other may be an aperture, for example, or may be filled with an insulating substance or the like.

According to the spatial light modulator 100 described above, the input light L1 is transmitted through the first electrode 103a of the light input and output unit 103 and is input to the input surface 101a of the perovskite-type electro-optic crystal 101. This input light L1 is reflected by the light reflecting unit 105 disposed on the rear surface 101b of the electro-optic crystal 101 and can be output from the light input and output unit 103. In this case, an electrical signal is input from the signal control circuit 107a to a part between the first electrode 103a provided in the light input and output unit 103 and the plurality of second electrodes 105a provided in the light reflecting unit 105. Consequently, an electric field is applied to the electro-optic crystal 101 having a high relative permittivity, so that the input light L1 can be modulated. In this spatial light modulator 100, the plurality of pixel electrodes 108a is electrically connected to the plurality of corresponding second electrodes 105a by the plurality of bumps 109a. Accordingly, when an electric field is applied to the electro-optic crystal 101, an electric field can be individually applied to the plurality of second electrodes 105a between the first electrode 103a and the plurality of second electrodes 105a. Therefore, electrical signals input to a plurality of electrodes are prevented from being mixed together, and the modulation accuracy can be stable.

In addition, the first electrode 103a is formed over the entire input surface 101a. For example, when a plurality of first electrodes 103a is provided to respectively correspond to the plurality of second electrodes 105a, it is difficult for the first electrode 103a and the second electrodes 105a to be positionally aligned. In the above configuration, there is no need to perform positional alignment of the first electrode 103a and the second electrodes 105a, so that manufacturing can, be easily performed.

In addition, in the light reflecting unit 105, the input light L1 is reflected by the plurality of second electrodes 105a. Therefore, there is no need to separately provide a reflecting layer or the like on the second electrode 105a side.

In addition, due to the configuration including the temperature control element 102 that controls the temperature of the electro-optic crystal 101, a uniform temperature for the electro-optic crystal 101 can be maintained. Accordingly, the modulation accuracy can be more stable. The temperature control element 102 may perform temperature control with respect to not only the electro-optic crystal 101 but also the entirety of the spatial light modulator 100 including the CMOS substrate 108 and the like.

Second Embodiment

Figure 5:
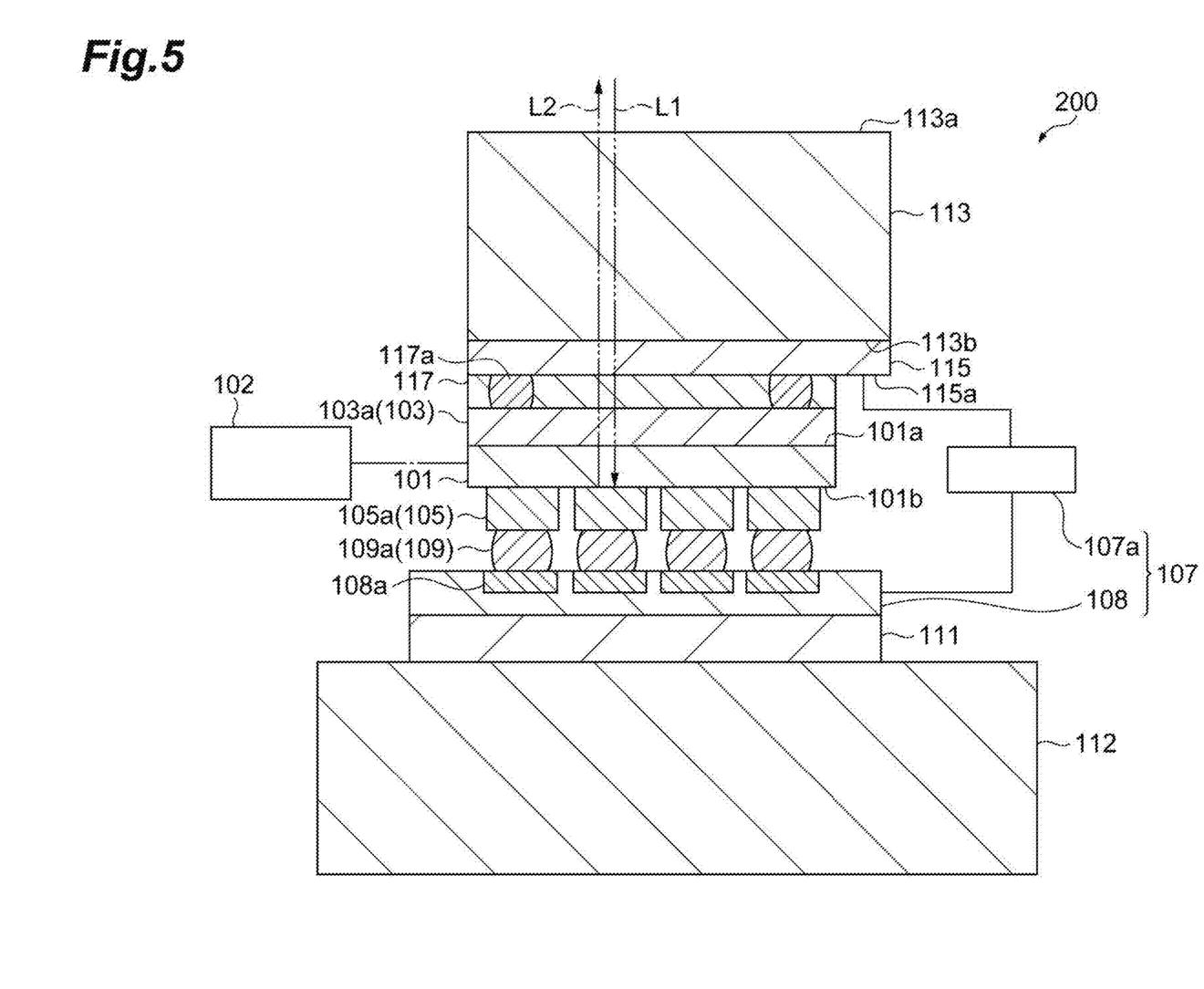
FIG. 5 is a cross-sectional view illustrating a spatial light modulator according to another embodiment.

A spatial light modulator 200 according to the present embodiment differs from the spatial light modulator 100 of the first embodiment in that the electro-optic crystal 101 is supported by a transparent substrate 113. Hereinafter, differences between the present embodiment and the first embodiment will be mainly described. The same reference signs are applied to the same elements or members, and detailed description thereof is omitted.

FIG. 5 is a cross-sectional view illustrating the spatial light modulator 200 according to the present embodiment. As illustrated in FIG. 5, the reflective spatial light modulator 200 includes the electro-optic crystal 101, the light input and output unit 103, the light reflecting unit 105, the drive circuit 107, and the electrode connection portion 109. The drive circuit 107 constituting the CMOS substrate 108 is fixed to the substrate 112. In the present embodiment, the thickness of the electro-optic crystal 101 in an optical axis direction may be 50 μm or smaller, for example.

The input surface 101a side of the electro-optic crystal 101 is supported by the transparent substrate 113 through which the input light L1 is transmitted. For example, the transparent substrate 113 is formed of a material such as glass, quartz, or plastic in a flat plate shape. The transparent substrate 113 has a first surface 113a to which the input light L1 is input, and a second surface 113b which is a surface on the opposite side of the first surface 113a and faces the light input and output unit 103 formed in the electro-optic crystal 101. A transparent electrode 115 formed of ITO, for example, is formed on the second surface 113b of the transparent substrate 113. The transparent electrode 115 is formed over the entire second surface 113b. The transparent electrode 115 may be formed by depositing ITO on the second surface 113b of the transparent substrate 113.

The first electrode 103a formed in the electro-optic crystal 101, and the transparent electrode 115 formed in the transparent substrate 113 adhere to each other with an adhesion layer 117 interposed therebetween. For example, the adhesion layer 117 is formed of an epoxy-based adhesive, through which the input light L1 is transmitted. For example, a conductive member 117a such as a metal sphere is disposed inside the adhesion layer 117. The conductive member 117a is in contact with both the first electrode 103a and the transparent electrode 115 and electrically connects the first electrode 103a and the transparent electrode 115 to each other. For example, the conductive member 117a is disposed at four corners of the adhesion layer 117 in a plan view.

In the present embodiment, the second surface 113b side of the transparent substrate 113 is formed to have a size in a plan view which is greater than the input surface 101a of the electro-optic crystal 101. Therefore, in a state in which the electro-optic crystal 101 is supported by the transparent substrate 113, a portion of the transparent electrode 115 formed in the transparent substrate 113 becomes an exposed portion 115a exposed to the outside. The signal control circuit 107a of the drive circuit 107 is electrically connected to the exposed portion 115a and the CMOS substrate 108. That is, since the signal control circuit 107a is electrically connected to the first electrode 103a via the transparent electrode 115 and the conductive member 117a, an electric field can be applied to a part between the first electrode 103a and the second electrodes 105a.

In such a spatial light modulator 200, phase modulation or retardation modulation can be more favorably performed by forming the electro-optic crystal 101 to have a small thickness in the optical axis direction. When the electro-optic crystal 101 is formed to be thin in this manner, there is concern that the electro-optic crystal 101 may be damaged due to an external shock or the like. In the present embodiment, since the input surface 101a side of the electro-optic crystal 101 is supported by the transparent substrate 113, the electro-optic crystal 101 is protected from an external shock or the like.

Hereinabove, the embodiments have been described in detail with reference to the drawings. However, the specific configuration is not limited to these embodiments.

Figure 6:
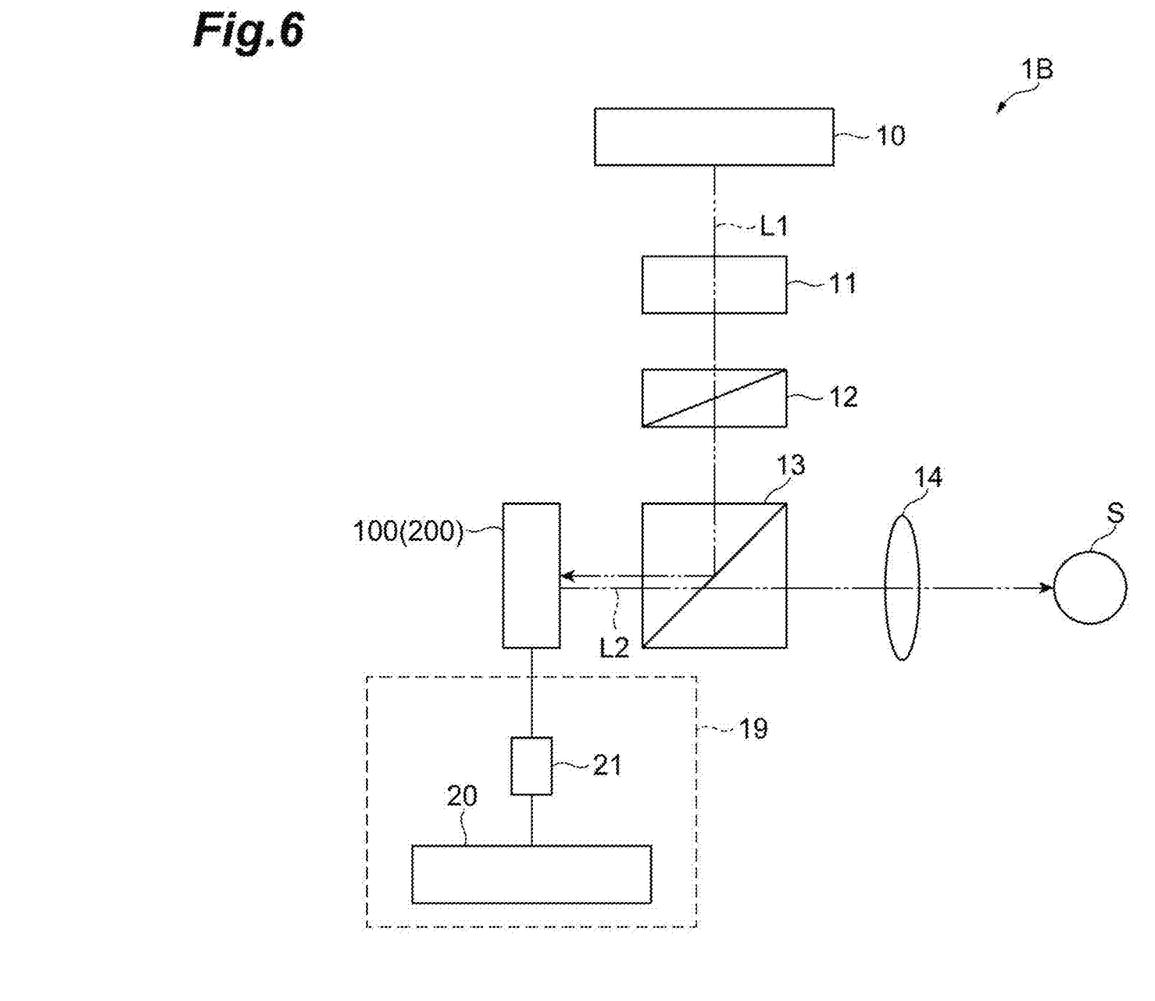
FIG. 6 is a block diagram illustrating a configuration of an optical irradiation device according to another embodiment.

For example, the above embodiment has illustrated an example of an optical observation device including a spatial light modulator. However, the embodiment is not limited thereto. For example, the spatial light modulator 100 may be mounted in an optical irradiation device 1B. FIG. 6 is a block diagram illustrating a configuration of an optical irradiation device. The optical irradiation device 1B has the light source 10, the collimator lens 11, the polarizer 12, the polarization beam splitter 13, the spatial light modulator 100, the first optical system 14, and a control unit that includes the computer 20 and the controller 21. In this configuration, the specimen S is irradiated by the first optical system 14 with the modulated light L2 output from the spatial light modulator 100. As functions of the spatial light modulator 100, (1) the position of an irradiation spot can be limited, (2) the position of the irradiation spot can be moved, (3) a plurality of irradiation spots can be formed at the same time, and (4) the phase of irradiation light can be controlled.

REFERENCE SIGNS LIST

1A Optical observation device
1B Optical irradiation device
100 Spatial light modulator (reflective spatial light modulator)
101 Electro-optic crystal
101a Input surface
101b Rear surface
103 Light input and output unit
103a First electrode
105 Light reflecting unit
105a Second electrode
107 Drive circuit
108a Pixel electrode (drive electrode)
109 Electrode connection portion
109a Bump
113 Transparent substrate
113a First surface
113b Second surface
L1 Input light

The invention claimed is:

1. A reflective spatial light modulator for modulating input light and outputting modulated light that has been subjected to modulation, the reflective spatial light modulator comprising:
   a perovskite-type electro-optic crystal having a relative permittivity of 1,000 or higher and including an input surface to which the input light is input and a rear surface which is a surface on an opposite side of the input surface;
   a light input and output unit disposed on the input surface of the electro-optic crystal and including a first electrode through which the input light is transmitted;
   a light reflecting unit including a plurality of second electrodes disposed on the rear surface of the electro-optic crystal and reflects the input light toward the light input and output unit;
   a drive circuit including a plurality of drive electrodes respectively corresponding to the plurality of second electrodes in the light reflecting unit and for applying an electric field between the first electrode and the second electrode by inputting an electrical signal to each of the plurality of drive electrodes; and
   an electrode connection portion including a plurality of bumps which is disposed such that the plurality of second electrodes and the plurality of drive electrodes corresponding to the plurality of second electrodes are electrically connected to each other,
   wherein a propagation direction of the input light is parallel or perpendicular to one of two axes obtained by rotating two crystal axes about one remaining crystal axis of the electro-optic crystal at an angle other than 0° and 90°.

2. The reflective spatial light modulator according to claim 1, further comprising:
   a transparent substrate including a first surface to which the input light is input and a second surface which is a surface on the opposite side of the first surface,
   wherein the second surface of the transparent substrate and the input surface of the light input and output unit face each other.

3. The reflective spatial light modulator according to claim 1,
   wherein the first electrode is formed over the entire input surface.

4. The reflective spatial light modulator according to claim 1,
   wherein in the light reflecting unit, the input light is reflected by the plurality of second electrodes.

5. The reflective spatial light modulator according to claim 1, wherein the electro-optic crystal is a crystal of $KTa_{1-x}Nb_xO_3$ ($0 \leq x \leq 1$), a crystal of $K_{1-y}Li_yTa_{1-x}Nb_xO_3$ ($0 \leq x \leq 1$ and $0 \leq y \leq 1$), or a PLZT crystal.

6. The reflective spatial light modulator according to claim 1, further comprising:
   a temperature controller configured to control a temperature of the electro-optic crystal.

7. An optical observation device comprising:
   a light source configured to output the input light;
   the reflective spatial light modulator according to claim 1;
   an optical system configured to irradiate a target with modulated light output from the reflective spatial light modulator; and
   a light detector configured to detect light output from the target.

8. An optical irradiation device comprising:
   a light source configured to output the input light;
   the reflective spatial light modulator according to claim 1; and
   an optical system configured to irradiate a target with modulated light output from the reflective spatial light modulator.

* * * * *